United States Patent
Landeck et al.

(10) Patent No.: US 9,857,029 B2
(45) Date of Patent: Jan. 2, 2018

(54) PRESSURE VESSEL COMPRISING A HEAT EXCHANGER FOR A CRYOGENICALLY STORED MEDIUM

(71) Applicant: Bayerische Motoren Werke Aktiengesellschaft, Munich (DE)

(72) Inventors: Bastian Landeck, Unterhaching (DE); Klaus Szoucsek, Halmhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 183 days.

(21) Appl. No.: 14/825,418

(22) Filed: Aug. 13, 2015

(65) Prior Publication Data

US 2015/0345707 A1  Dec. 3, 2015

Related U.S. Application Data

(63) Continuation of application No. PCT/EP2014/050919, filed on Jan. 17, 2014.

(30) Foreign Application Priority Data

Feb. 20, 2013  (DE) .................. 10 2013 202 779

(51) Int. Cl.
  *F24D 19/02* (2006.01)
  *F17C 13/00* (2006.01)
  *F17C 1/04* (2006.01)
  *F17C 1/00* (2006.01)

(52) U.S. Cl.
  CPC .............. *F17C 13/001* (2013.01); *F17C 1/00* (2013.01); *F17C 1/04* (2013.01); *F17C 13/002* (2013.01);
  (Continued)

(58) Field of Classification Search
  CPC .. F17C 13/001; F17C 1/00; F17C 1/04; F17C 13/002; F17C 2201/0109; F17C 2201/056; F17C 2223/036
  (Continued)

(56) References Cited

U.S. PATENT DOCUMENTS

2004/0108319 A1  6/2004  Bettinger
2005/0147513 A1*  7/2005  Noble ................. F02M 21/06
                                                                417/437

(Continued)

FOREIGN PATENT DOCUMENTS

DE  10 2008 024 292 A1  11/2009
EP    1 722 152 A2      11/2006
(Continued)

OTHER PUBLICATIONS

International Search Report dated May 8, 2014 (Three (3) pages).
(Continued)

*Primary Examiner* — Davis Hwu
(74) *Attorney, Agent, or Firm* — Crowell & Moring LLP

(57) ABSTRACT

The invention relates to a pressure vessel comprising a heat exchanger for a cryogenically stored medium, especially for use in a motor vehicle, especially for use as a pressure tank for hydrogen. Said pressure vessel includes a cylindrical jacket and rounded-off end faces which are rolled onto the ends of the jacket and which have centrally arranged openings closed by welded-in inserts, at least one first insert having filling and removal devices. The invention is characterized in that the inserts form bearings on which at least one in-tank heat exchanger is mounted.

14 Claims, 2 Drawing Sheets

(52) U.S. Cl.
CPC ............... *F17C 2201/0109* (2013.01); *F17C 2201/056* (2013.01); *F17C 2203/0619* (2013.01); *F17C 2205/0397* (2013.01); *F17C 2221/012* (2013.01); *F17C 2221/033* (2013.01); *F17C 2223/0123* (2013.01); *F17C 2223/036* (2013.01); *F17C 2227/0306* (2013.01); *F17C 2227/0309* (2013.01); *F17C 2227/0339* (2013.01); *F17C 2227/0372* (2013.01); *F17C 2260/02* (2013.01); *F17C 2260/023* (2013.01); *F17C 2260/025* (2013.01); *F17C 2270/0168* (2013.01); *Y02E 60/321* (2013.01)

(58) Field of Classification Search
USPC ........................................................ 165/53
See application file for complete search history.

(56) References Cited

U.S. PATENT DOCUMENTS

2007/0246122 A1    10/2007   Handa
2008/0192805 A1    8/2008   Harty
2008/0209917 A1    9/2008   Adler
2008/0290645 A1    11/2008   Handa
2009/0114367 A1    5/2009   Handa

FOREIGN PATENT DOCUMENTS

| | | |
|---|---|---|
| EP | 1 726 869 A2 | 11/2006 |
| JP | 2002-181295 A | 6/2002 |
| JP | 2008-546956 A | 12/2008 |
| JP | 2011-503468 A | 1/2011 |
| WO | WO 2006/133816 A1 | 12/2006 |

OTHER PUBLICATIONS

German Search Report issued in German counterpart application No. 10 2013 202 779.6 dated Oct. 13, 2016, with Statement of Relevancy (Nine (9) pages).

Japanese Office Action issued in Japanese counterpart application No. 2015-557359 dated May 10, 2017 (Three (3) pages).

\* cited by examiner

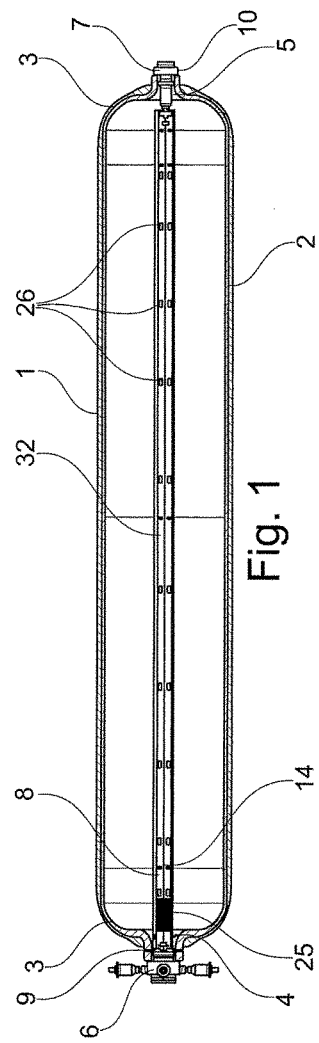
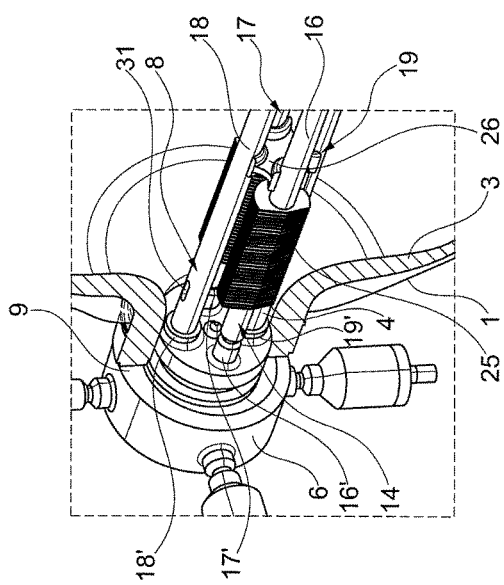

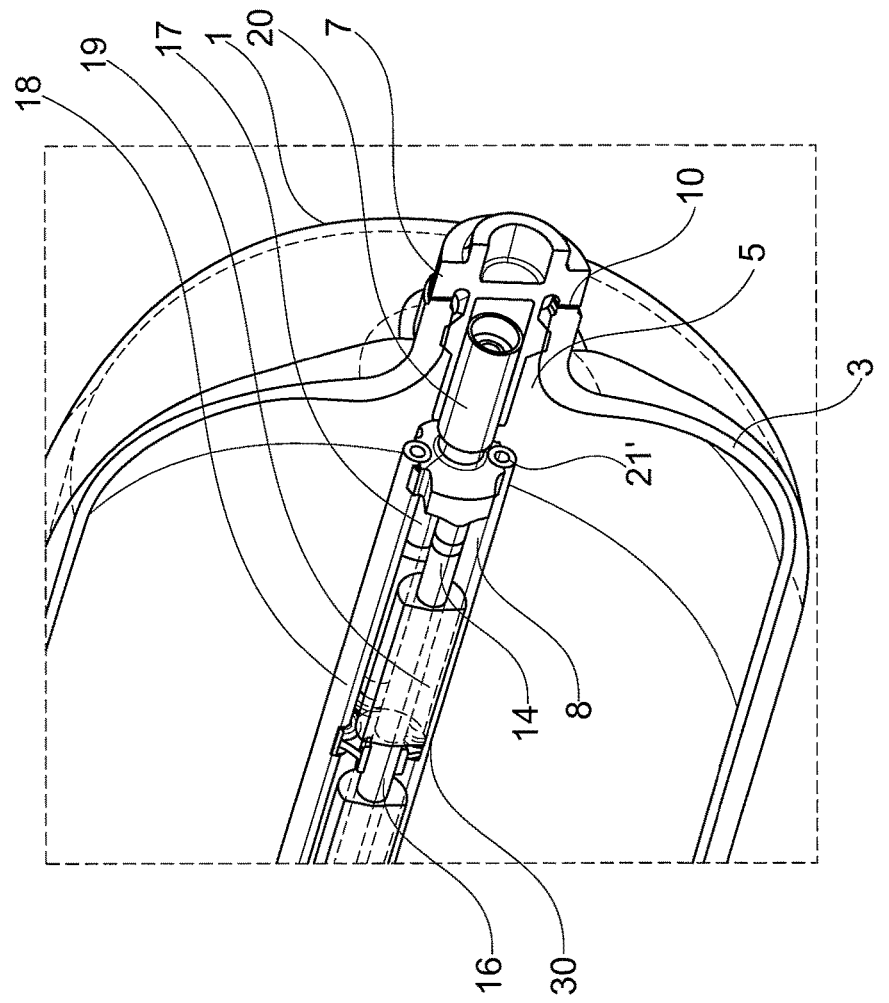
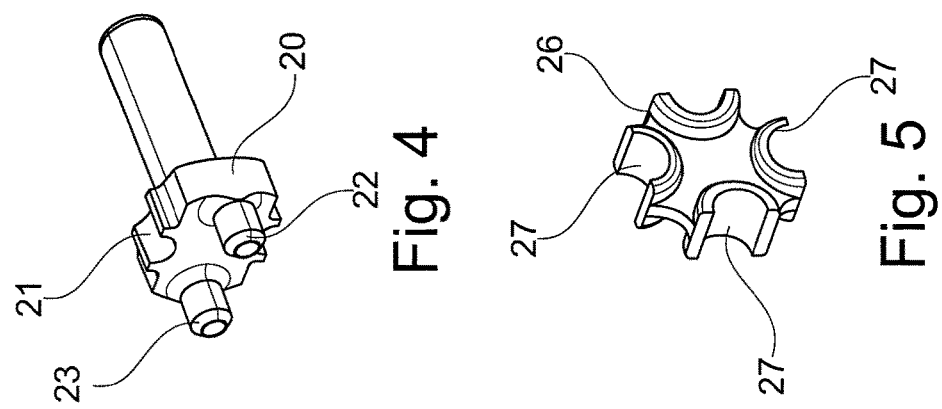
Fig. 3
Fig. 4
Fig. 5

US 9,857,029 B2

PRESSURE VESSEL COMPRISING A HEAT EXCHANGER FOR A CRYOGENICALLY STORED MEDIUM

CROSS REFERENCE TO RELATED APPLICATIONS

This application is a continuation of PCT International Application No. PCT/EP2014/050919, filed Jan. 17, 2014, which claims priority under 35 U.S.C. §119 from German Patent Application No. 10 2013 202 779.6, filed Feb. 20, 2013, the entire disclosures of which are herein expressly incorporated by reference.

BACKGROUND AND SUMMARY OF THE INVENTION

The invention relates to a pressure vessel comprising a heat exchanger for a cryogenically stored medium, in particular for use in a motor vehicle, in particular as a pressure tank for hydrogen.

It is already known to use hydrogen as a fuel for motor vehicles and, for this purpose, to store the latter in a pressure tank under positive pressure. Pressure tanks of this type can consist of steel or lightweight metal. For a relatively high filling pressure, for example, such a substantially cylindrical lightweight metal tank can be wrapped with a fiber composite material comprising, for example, glass and/or carbon fibers.

For the handling of cryogenically stored fuel, it is advantageous if a heat exchanger is accommodated in the pressure vessel. This is described by WO 2006/133816 A1. The storage vessel described there for cryogenically stored hydrogen has a condensing line with heat exchanger which is used to supply gaseous cryogenic medium which, in the heat exchange, is cooled down against the stored cryogenic medium. However, in pressure vessels for cryogenically stored medium, also called cryotanks, it is also usual to accommodate heat exchangers which are used only to increase the pressure of the medium in the cryotank as necessary by means of an input of heat from outside, in order for example to accelerate removal of the medium. Such a heat exchanger, which has no opening to the interior of the pressure vessel or cryotank and is supplied with heat exchange medium only from outside the cryotank, is nevertheless normally operated with the medium stored in the vessel as a heat exchange medium as well, since not many usual heat exchange media are suitable for cryogenic application and since it is therefore simpler then to use the substance already cryogenically stored in the pressure vessel as a heat exchange medium for cryogenic application.

In the event of necessary large-scale production, the most economical production of such a pressure vessel comprising in-tank heat exchanger is important, and this leads to the object of the invention to specify a pressure vessel comprising heat exchanger for cryogenically stored medium which, in a short time and with low costs, can be produced with constant, good quality.

According to the invention, a pressure vessel for a cryogenically stored medium, comprising a cylindrical jacket and rounded-off end faces which are rolled onto the ends of said jacket and which have centrally positioned openings which are closed by welded-in inserts, at least one first insert being provided at least with filling and removal devices, is characterized in that the inserts form bearings, to which at least one in-tank heat exchanger is fitted.

The pressure vessel according to the invention can thus be produced independently of the in-tank heat exchanger. The latter is fixed to the inserts and welded to the latter, which means that the production time and therefore the production costs can be reduced considerably, and the production quality with regard to tightness of the heat exchanger can be guaranteed.

Advantageous embodiments of the invention are characterized in that the in-tank heat exchanger extends in the axial direction from the first insert to a second insert. This can advantageously be implemented in such a way that the in-tank heat exchanger comprises two pipes, a feed pipe and a return pipe, which are fitted individually to the first insert and are mounted together on the second insert via a connecting device, wherein the feed pipe can be charged with cryogenic medium from outside the pressure vessel via a filling opening in the first insert, and, in the further course, the cryogenic medium flows through the feed pipe via the connecting device into the return pipe and from the latter into the pressure vessel via a first outlet opening, or is led out of the pressure vessel through the first insert via an outlet opening in the latter. Beneficially, the first outlet opening is fitted in the return pipe, in the vicinity of the first insert, or in the first insert, while devices of any type carrying further heat exchange media are fitted to the outlet opening outside the pressure vessel. In order to support the heat exchange process between the pipes and the pressure vessel content, it is advantageous if the pipes of the in-tank heat exchanger are provided with heat exchange fins on the outside, at least in some sections. Here, it is very beneficial for the production of the pressure vessel comprising heat exchanger if the circumference of the entire heat exchanger is smaller than the openings in the pressure vessel which are closed by the inserts. Thus, before the mounting of the pressure tank, an insert can already be connected to the in-tank heat exchanger. During the mounting, this insert comprising the heat exchanger is then inserted into the pressure vessel and connected to the latter, while the other insert is subsequently connected to the pressure vessel, closing the pressure vessel and holding the in-tank heat exchanger.

Preferred embodiments of the invention are characterized in that the inserts form bearings, to which the filling and removal devices are fitted. These advantageously extend in the axial direction from the first insert to the second insert. Then, they can comprise two further pipes, a filling pipe and a removal pipe, which are mounted individually on the first insert and are mounted on the second insert via the connecting device. This has the advantage that the mounting of the filling and removal devices can be carried out together and in the same way as the in-tank heat exchanger. To this end, the removal pipe is advantageously fitted or mounted above the filling pipe and the feed pipe is fitted or mounted beside the return pipe on the first insert and on the connecting device such that the four pipes together cover a rectangle arranged horizontally and symmetrically with respect to the mid-axis of the pressure vessel. The corners of this rectangle are located within the areas of the openings of the pressure vessel for this purpose. It is then possible for all four pipes, mounted on the first insert, to be slid into the pressure vessel, corresponding to the above description for the in-tank heat exchanger pipes. In order to reinforce these internal fittings, it is further advantageous if the four pipes are kept at a distance from one another by transverse stiffeners introduced between them. An embodiment which is to be emphasized particularly qualitatively is achieved if the removal pipe, the filling pipe, the feed pipe and the return pipe are drawn seamlessly from a lightweight metal material. These can then be connected particularly reliably in a gas-tight manner to the first insert and to the connecting device by welding if the last-named devices likewise consist of a lightweight metal material, in particular if the liner of the pressure vessel likewise consists of lightweight metal.

Furthermore, it is advantageous if the filling pipe can be charged with cryogenic medium from outside the pressure vessel via a filling opening in the first insert, and, in the further course, the cryogenic medium flows through the filling pipe until in the vicinity of the connecting device and from there into the pressure vessel via a second outlet opening in the filling pipe. In this way, even during the filling operation via the filling pipe, an advantageous exchange of heat between the pressure vessel content and the medium introduced takes place. While the removal pipe advantageously has a removal opening through which cryogenic medium of the pressure vessel content can flow into the removal pipe and, in the further course, the cryogenic medium can flow from the removal pipe through the first insert and can thus be removed outside the pressure vessel. Such a removal device is constructed very simply.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a longitudinal section through the pressure tank with in-tank heat exchanger and filling and removal device, FIG. 2 shows an enlarged three-dimensional partial view of the sectioned pressure tank in the area of the filling and removal device, FIG. 3 shows an enlarged three-dimensional partial view of the sectioned pressure tank in the area of the connecting device, FIG. 4 shows the connecting device in an enlarged three-dimensional view, and FIG. 5 shows a transverse stiffener in an enlarged three-dimensional view.

DETAILED DESCRIPTION OF THE DRAWINGS

A pressure vessel 1, which is provided for use as a hydrogen tank for the cryogenic storage of hydrogen in a motor vehicle, not shown, is bent from a plate to form a cylindrical jacket 2, the ends of which are rolled over such that at each end a rounded-off end face 3 with a centrally positioned opening 4, 5 is produced. By means of welding, the openings 4, 5 are closed with inserts 6, 7, a first insert 6 being provided with a filling and removal device 8 and an in-tank heat exchanger 14, which are fixed to the first insert 6, being slid into the pressure vessel through the opening 4. Contact faces 9, 10 at each welding location between the jacket 2 and the inserts 6, 7, for gas-tight connection by means of laser or electron beam welding, are configured so as to butt flush against each other for this purpose. The electron beam welding is carried out in high vacuum.

The pressure vessel 1 is fixed outside the high vacuum via two supports, not shown; for this purpose, a first tailstock, not shown, is fed in against the first insert 6, finally positioned in its opening 4. Four seamlessly drawn pipes 16, 17, 18, 19 made of lightweight metal, a feed pipe 16 and a return pipe 17 of the in-tank heat exchanger 14, and a removal pipe 18 and a filling pipe 19 of the filling and removal device 8, have already previously been connected in a gas-tight manner by means of welding to this first insert 6 made of lightweight metal.

The second insert 7, which carries the heat exchanger 14 and the filling and removal device 8 supported in a displaceable manner via a connecting device 20, is positioned in relation to its opening 5 such that a gap remains between the contact faces 10.

Then, the pressure vessel 1 prepared in this way is moved into the vacuum chamber of the electron beam welding system, the latter is evacuated and then a second tailstock, not illustrated, is finally positioned on the second insert 7 by means of an automated hydraulic feed mechanism. In the process, the second insert 7 is slid into the opening 5 until the contact faces 10 touch each other. The pressure vessel 1 is loaded in the welding position as a result via the two inserts 6, 7 and the tailstocks of the latter, whereupon the inserts 6, 7 are welded to the pressure vessel 1 one after another or simultaneously. As the tailstock of the second insert 7 is fed in, the loose bearing of the connecting device 20 is pushed together a little more.

As a result of positioning the second insert 7 in the opening 5 such that the gap remains between the contact faces, the pressure vessel 1, after being moved into the vacuum chamber, can be evacuated very quickly in the latter, since the opening 5 together with the gap is very much larger than the opening cross sections of the filling and removal device 8 on the first insert 6, through which the evacuation of the pressure vessel 1 would otherwise have to take place.

The in-tank heat exchanger 14 and the filling and removal device 8 are therefore mounted in the pressure vessel 1 via the inserts 6, 7. Located on the first insert 6 (FIG. 2) are the fixed bearings, which means the four pipes 16, 17, 18, 19 are introduced into four pipe supports 16', 17', 18', 19' of the first insert 6 and welded. The loose bearing (FIG. 3) is located on the second insert 7, between the latter and the connecting device 20 pushed into the same and displaceably guided. The latter in turn carries the pipes 16, 17, 18, 19. The feed pipe 16 of the in-tank heat exchanger 14 is connected to its return pipe 17 via a channel, not visible, in the connecting device 20, is pushed onto and welded in a gas-tight manner to the inlet 22 and outlet 23 thereof (FIG. 4). While the removal pipe 18 and the filling pipe 19 of the filling and removal device 8 are only mounted on the connecting device 20 in a respective bearing recess 21, 21', the feed pipe 16 can be charged with cryogenic medium from outside the pressure vessel 1 via a filling opening, not visible, in the first insert 6, in the further course the cryogenic medium here as heat exchange medium passing through the feed pipe 16 via the channel in the connecting device 20 into the return pipe 17 and, in turn, from the latter via the first insert out of the pressure vessel 1 through an outlet opening not visible in the figures. In order to benefit the heat exchange, the pipes 16, 17 of the in-tank heat exchanger 14 are provided with heat exchange fins 25 on the outside in some sections. The bearings via which the filling and removal device 8 is fitted to the first insert 6 are formed by the pipe supports 19', 18'. On the second insert 7, the connecting device 20 is displaceably mounted via a loose bearing, on which in turn supports for the filling and removal device 8 are formed as bearing recesses 21', 21. The filling pipe 19 can be charged with cryogenic medium from outside the pressure vessel 1 via a filling opening, not visible, in the first insert 6, in the further course the cryogenic medium flowing through the filling pipe 19 until in the vicinity of the connecting device 20 and from there into the pressure vessel 1 via a second outlet opening 30 in the filling pipe 19.

The removal pipe 18 has a removal opening 31 through which cryogenic medium of the pressure vessel content can flow into the removal pipe 18 and, in the further course, the cryogenic medium flows from the removal pipe 18 through the first insert 6 and can thus be removed outside the pressure vessel 1.

Filling and removal device 8 and in-tank heat exchanger 14 are thus conceived as an insert for the pressure vessel 1, wherein the pressure vessel insert can be inserted into the pressure vessel 1 through the opening 4 in the latter. The removal pipe 18 is fitted above the filling pipe 19 and the feed pipe 16 is fitted beside the return pipe 17 on the first insert 6 and on the connecting device 20 such that the four pipes 16, 17, 18, 19 together cover a rectangle, arranged horizontally and symmetrically with respect to the mid-axis 32 of the pressure vessel 1.

Between the pipes 16, 17, 18, 19, transverse stiffeners 26 (FIG. 5) are introduced, each having four pipe support devices 27, which keep the pipes 16, 17, 18, 19 at a distance from one another and contribute to the secure, vibration-free mounting of the same.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel for a cryogenically stored medium, comprising a cylindrical jacket and rounded-off end faces which are rolled onto the ends of said cylindrical jacket and which have centrally positioned openings which are closed by welded-in inserts, at least one first insert being provided at least with filling and removal devices, and wherein the inserts form bearings, to which at least one in-tank heat exchanger is fitted,
   wherein the in-tank heat exchanger comprises a feed pipe and a return pipe, fitted individually to the first insert and mounted together on the second insert via a connecting device, wherein the feed pipe can be charged with cryogenic medium from outside the pressure vessel via a filling opening in the first insert, and wherein the cryogenic medium flows through the feed pipe via the connecting device into the return pipe, and from the return pipe into the pressure vessel via a first outlet opening, or is led out of the pressure vessel through the first insert via an outlet opening.

2. The pressure vessel as claimed in claim 1, wherein the in-tank heat exchanger extends in the axial direction from the first insert to a second insert.

3. The pressure vessel as claimed in claim 1, wherein the first outlet opening is fitted in the return pipe in the vicinity of the first insert.

4. The pressure vessel as claimed in claim 1, wherein the first outlet opening is fitted in the first insert.

5. The pressure vessel as claimed in claim 1, wherein heat exchange fins are provided on at least a portion of an outside of the feed pipe and return pipe.

6. The pressure vessel as claimed in claim 1, wherein the inserts form bearings, to which the filling and removal devices are fitted.

7. The pressure vessel as claimed in claim 1, wherein the filling and removal devices extend in the axial direction from the first insert to the second insert.

8. A pressure vessel for a cryogenically stored medium, comprising a cylindrical jacket and rounded-off end faces which are rolled onto the ends of said cylindrical jacket and which have centrally positioned openings which are closed by welded-in inserts, at least one first insert being provided at least with filling and removal devices, and wherein the inserts form bearings, to which at least one in-tank heat exchanger is fitted, wherein the filling and removal devices further comprise a filling pipe and a removal pipe, which are mounted individually on the first insert and are mounted on the second insert via the connecting device.

9. The pressure vessel as claimed in claim 8, wherein the filling pipe can be charged with cryogenic medium from outside the pressure vessel via a filling opening in the first insert, and wherein the cryogenic medium flows through the filling pipe to a vicinity of the connecting device, and from the vicinity of the connecting device into the pressure vessel via a second outlet opening in the filling pipe.

10. The pressure vessel as claimed in claim 8, wherein the removal pipe has a removal opening through which cryogenic medium of the pressure vessel content can flow into the removal pipe, and wherein the cryogenic medium can flow from the removal pipe through the first insert, thereby being removed from the pressure vessel.

11. The pressure vessel as claimed in claim 8, wherein the removal pipe is fitted or mounted above the filling pipe and the feed pipe is fitted or mounted beside the return pipe on the first insert and on the connecting device such that the removal pipe, the filling pipe, the feed pipe and the return pipe together cover a rectangle arranged horizontally and symmetrically with respect to the mid-axis of the pressure vessel.

12. The pressure vessel as claimed in claim 11, wherein the removal pipe, the filling pipe, the feed pipe and the return pipe are kept at a distance from one another by transverse stiffeners introduced between them.

13. The pressure vessel as claimed in claim 8, wherein the removal pipe, the filling pipe, the feed pipe and the return pipe are drawn seamlessly from a lightweight metal material.

14. The pressure vessel as claimed in claim 8, wherein the removal pipe, the filling pipe, the feed pipe and the return pipe are connected in a gas-tight manner to the first insert and to the connecting device by welding.

* * * * *